Howard W. Leitch & William E. Caldwell
INVENTORS

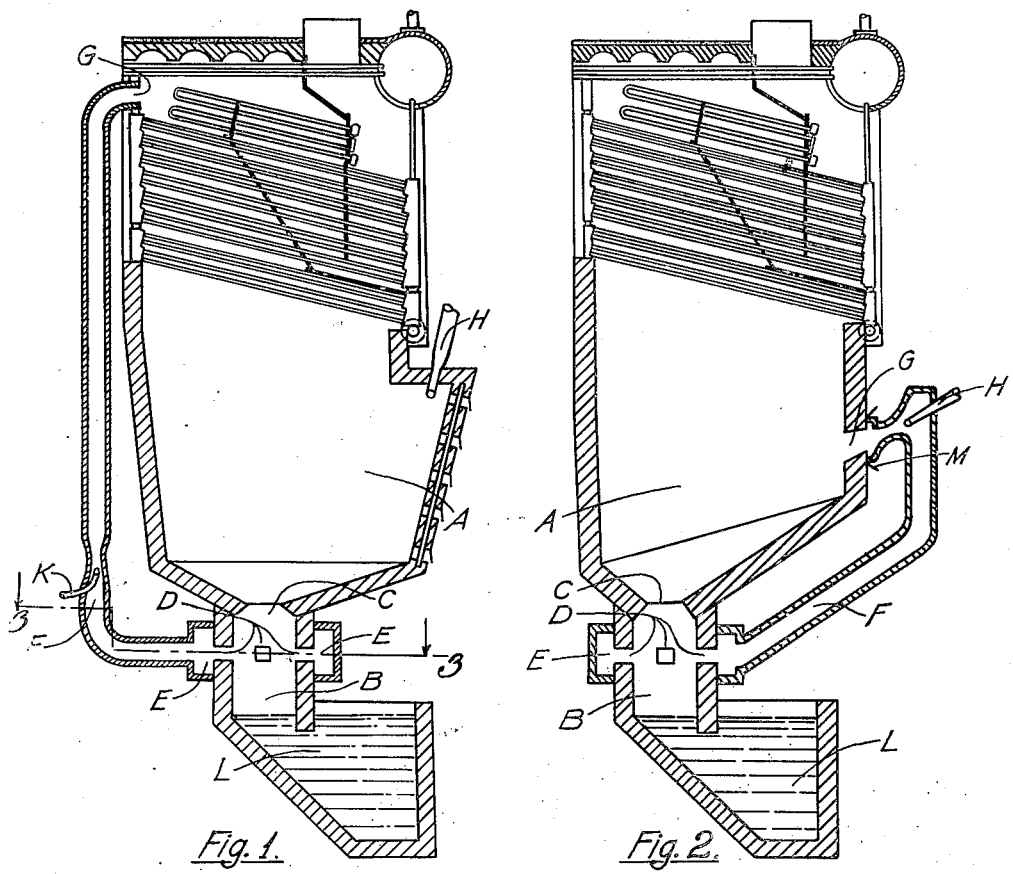
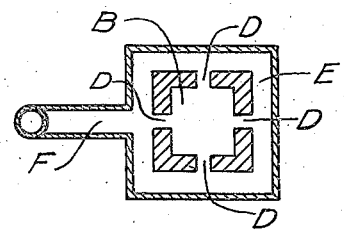
Fig. 1. Fig. 2. Fig. 3.
Howard W. Leitch & William E. Caldwell
INVENTORS Feb. 23, 1932.  H. W. LEITCH ET AL  1,846,647
PULVERIZED FUEL FURNACE
Filed June 27, 1925    2 Sheets-Sheet 2

BY
Charles J. Holland
ATTORNEY.

Patented Feb. 23, 1932

1,846,647

UNITED STATES PATENT OFFICE

HOWARD W. LEITCH AND WILLIAM E. CALDWELL, OF NEW YORK, N. Y.

PULVERIZED FUEL FURNACE

Application filed June 27, 1925. Serial No. 39,951.

Our invention relates to furnaces adapted to burn pulverized fuel.

Many furnaces are at present in use in which the pulverized fuel is blown into the combustion chamber from the top or from the sides. Much apparatus is also in use adapted for service with this type of feed. When the pulverized fuel is fed into the furnace in this manner the higher temperatures are usually at about the middle of the combustion chamber, while the bottom of the chamber is comparatively cool. The location of these higher temperatures depends chiefly upon the conformation of the flame path within the combustion chamber. As the fuel is blown in, it is ignited, and the flame is propelled across the combustion chamber in the direction in which the fuel is blown. It then turns upward and at the turning point, the gases eddy about a small area, causing a very intense combustion and a zone of very high temperature.

It is the object of the present invention, to provide a furnace in which the pulverized fuel is fed into the combustion chamber at the top, or at the sides, and in which a temperature sufficiently high to cause the ash to flow is maintained near the bottom of the combustion chamber. To accomplish this the flame path is lengthened and deflected so that it will come close to the bottom of the combustion chamber before turning upwards and the eddy of gases and consequent higher temperature are caused at this turning point. The ash must then fall through this region of high temperature and become fluid and then flow out of the furnace. One of the greatest difficulties with pulverized fuel furnaces at the present time, is that the ash has a tendency to slag and form into a hard mass at the bottom of the furnace, but our improved furnace, in which the ash is caused to flow out through the bottom, overcomes this defect. Other objects and advantages will appear hereinafter.

The invention of the present application will be more clearly understood from the drawings to which reference is now made.

Fig. 1 is a vertical cross-section of a form of furnace embodying our invention. Fig. 2 is a modification of a furnace similar to that of Fig. 1.

Fig. 3 is a horizontal cross-section of the draft chamber and its pipe connection.

Similar characters of reference in each drawing refer to similar parts.

Figure 4:
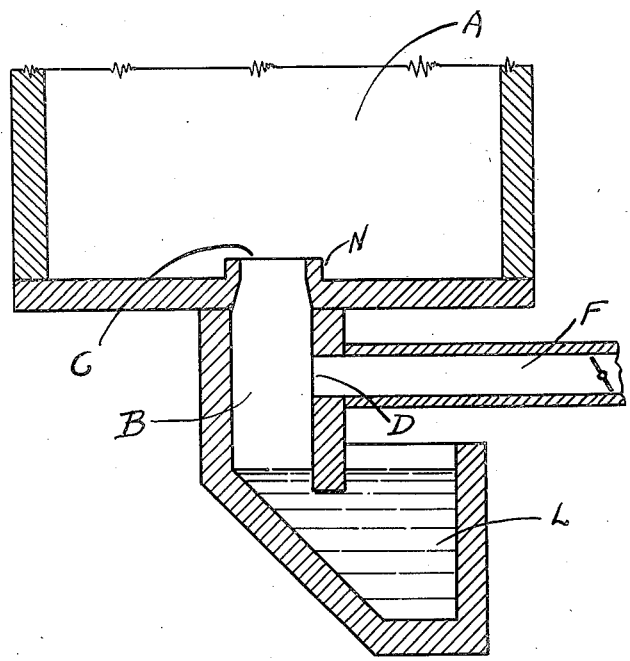
Fig. 4 is a vertical section of an alternate form of the furnace of this invention.
Figure 5:
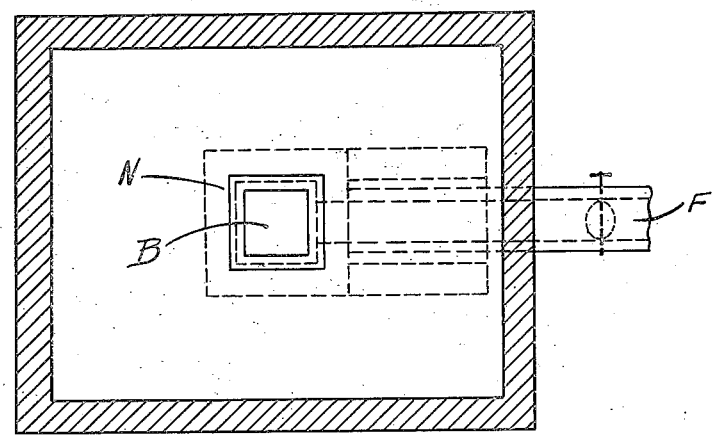
Fig. 5 is a plan view of the floor of the combustion chamber of the furnace shown in Fig. 4.

In Fig. 1, A represents the combustion chamber; B, the draft chamber communicating with A through the opening, C. Ports D, in the sides of the draft chamber open into an enclosed compartment EE, which runs entirely around the draft chamber, B. The compartment communicates with the pipe, F, leading to the space containing the water tubes and superheater tubes, into which it opens at G. The pulverized fuel mixed with air is blown into the combustion chamber through the nozzle, H, and ignited in the usual manner. A steam jet, K, causes a strong upward draft within the pipe, F, into which it is inserted and this, in turn, causes a strong down draft from the combustion chamber through the draft chamber. This results in a lengthening of the flame path from the nozzle, H, to a point just above the opening, C, of the draft chamber, B, at which point the flames turn upward. At this turning point there will be a region of very high temperature, so high in fact that the ash passing into it will melt and flow. Below the draft chamber is an ash hopper, L, which is represented in the drawings as water sealed to prevent air from entering the draft chamber and interfering with the down draft through the draft chamber or with the combustion of the powdered fuel in the combustion chamber.

Stated in different terms, the chamber B may be described as a slag-receiving chamber. The bottom of this chamber is the water-seal means which catches the slag, chills it and permits it to be removed without ingress of outside air into the slag chamber to interfere with the draft in the pipe F and the drawing of a portion of the hot gaseous products of combustion from the combustion chamber A of the furnace down through the slag-opening C. The suction-draft means in its preferred form comprises a draft or suction-producing pipe F together with an injector K (Fig. 1) in the pipe to reinforce the draft created by the pipe itself by reason of the fact that its outlet is connected beyond the combustion chamber to the portion of the furnace occupied by the boiler if it be a steam-raising furnace as in Fig. 1. Thus, irrespective of the injector K, the stack applies a differential suction to the combustion chamber A and to the egress side of the slag-opening, the stack suction on the latter being so much greater than on the combustion chamber that a continuous flow of a portion of the hot gases of combustion takes place from the combustion chamber through the slag-opening C and then by way of the draft passage F to the stack part of the furnace.

The gases drawn off through the pipe, F, are very hot and if they were carried off out of the furnace there would be a resulting loss of heat and a consequent lowered efficiency of the furnace. This hot gas, however, is returned to the superheater tubes of the furnace at G, where it assists in performing the work of the furnace, which in the instance shown is the heating of the water tubes and raising of steam.

In Fig. 2 is a furnace of type similar to that shown in Fig. 1, except that the fuel is fed into the combustion chamber from the side. This drawing, however, shows a different mode of utilizing the hot gases drawn off through the draft chamber. The pipe, F, it will be observed, is brought around from the enclosed compartment, E, to the nozzle, H, through which the pulverized fuel is blown into the combustion chamber. With the pulverized fuel is mixed the primary air supply and if desired secondary air may be mixed with the fuel through the port, M. In this form of construction an upward draft is created in the pipe, F, by the entraining action of the blast of fuel and air coming in through the fuel and air ports, H and M. Portions of the hot gases are consequently drawn down from the combustion chamber through the draft chamber and rise through the pipe, F, where their great heat raises the temperature of the coal before it enters the combustion chamber thus furthering the process of combustion. There is consequently no loss of heat or lowered efficiency except by radiation from the walls of the pipe, F, and this is negligible. The path of flame in the side feed furnace shown in Fig. 2 is deflected by the down draft in the combustion chamber to the opening, C, of the draft chamber, B, and a region of very high temperatures is thus created at a point just above the opening, C. The falling ash must pass through this zone of high temperature where it melts and falls through the draft chamber into the watersealed ash hopper, L.

In Fig. 4 the dike, N, around the opening or well, C, leading into the draft chamber, B, holds a certain depth of molten ash behind it but when the molten ash attains a depth of more than the height of the dike, N, it flows over the top and drops through the draft chamber, B, into the water in the ash hopper, L. This drawing also shows the draft pipe, F, connecting directly with the draft chamber, B, without the intermediate compartment shown at E, in Figs. 1 and 2.

We do not limit ourselves to a furnace designed for any particular service. The drawings which show a steam raising furnace are for purposes of illustrating the principle of our invention, only, and this principle may be applied to furnaces adapted to other uses than raising steam. In such cases, however, the pipe, F, might be arranged to conduct the hot gases to a point in the furnace where they would assist in performing the work of that particular type of furnace. It is also apparent that various changes will readily suggest themselves to, and be employed by those skilled in the art without departing from the principle illustrated.

It will be understood that the expressions "suction-draft producing means", or "suction-producing means" are intended to be broadly definitive so as to include, for example, the draft pipe F connected as shown in Fig. 1, quite irrespective of the presence or absence of the injector K therein. Also, to include, for example, the draft pipe F having combined therewith the injector K in a furnace installation where it is not possible to connect the draft pipe F as in Fig. 1 to create sufficient draft for the purpose of the invention.

Having thus described our invention, what we claim is:

1. In a furnace for burning pulverized fuel, in combination, the pulverized fuel burner; the combustion chamber of the furnace with its slag-opening remote from said burner and delivering from the combustion chamber to the outside of the furnace; and suction-draft producing means in connection with said slag-opening on the egress side thereof drawing a portion of the hot gaseous products from the combustion chamber out through the slag-opening to keep the slag molten at and about said opening.

2. In a furnace for burning pulverized fuel, in combination, with the combustion chamber of the furnace and its slag-opening; a sufficiently air-tight slag-receiving chamber connected with said slag-opening; and suction producing means connected with the slag-receiving chamber which positively sucks part of the gaseous products of combustion from the combustion chamber through the slag-opening into and away from the slag-receiving chamber.

3. In a furnace for burning pulverized fuel, in combination, the pulverized fuel burner; the combustion chamber of the furnace with its slag-opening remote from said burner and delivering from the combustion chamber to the outside of the furnace; a passageway in connection with said slag-opening on the egress side of said opening; and jet-means therein for creating a draft through said passageway in a direction away from said opening.

4. In a furnace for burning pulverized fuel, in combination with the combustion chamber of the furnace and its slag-opening and stack; a sufficiently air-tight slag-receiving chamber connected with said slag-opening; a boiler operatively located in the furnace between the combustion chamber and the stack; and a draft passage having its inlet connected with the slag-receiving chamber and having its outlet connected to a point in the furnace at the boiler where there is a substantial resistance due to the boiler to the flow of the hot gases from the combustion chamber to said point of connection.

5. In a furnace for burning pulverized fuel, in combination with the combustion chamber of the furnace and its slag-opening and stack; a sufficiently air-tight slag-receiving chamber connected with said slag-opening; a boiler operatively located in the furnace between the combustion chamber and the stack; and a draft passage having its inlet connected with the slag-receiving chamber and having its outlet connected beyond the combustion chamber to the portion of the furnace occupied by the boiler.

In testimony whereof, we have hereunto set our hands this 26th day of June, 1925.

HOWARD W. LEITCH.
WILLIAM E. CALDWELL.